US011955712B2

(12) United States Patent
Sowpati et al.

(10) Patent No.: US 11,955,712 B2
(45) Date of Patent: Apr. 9, 2024

(54) SELF-DECOUPLED COMPACT CAVITY ANTENNA

(71) Applicants: HUAWEI TECHNOLOGIES CO., LTD., Shenzhen (CN); Arun Sowpati, Kista (SE)

(72) Inventors: Arun Sowpati, Kista (SE); Jouni Pennanen, Kista (SE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 226 days.

(21) Appl. No.: 17/621,947

(22) PCT Filed: Jul. 3, 2019

(86) PCT No.: PCT/EP2019/067883
§ 371 (c)(1),
(2) Date: Dec. 22, 2021

(87) PCT Pub. No.: WO2021/001038
PCT Pub. Date: Jan. 7, 2021

(65) Prior Publication Data
US 2022/0320744 A1 Oct. 6, 2022

(51) Int. Cl.
*H01Q 13/18* (2006.01)
*H01Q 1/24* (2006.01)

(52) U.S. Cl.
CPC ............ *H01Q 13/18* (2013.01); *H01Q 1/243* (2013.01)

(58) Field of Classification Search
CPC .......... H01Q 1/243; H01Q 1/521; H01Q 9/44; H01Q 13/18; H01Q 13/10; H01Q 21/28
See application file for complete search history.

(56) References Cited

U.S. PATENT DOCUMENTS

| | | | |
|---|---|---|---|
| 10,200,092 B1 | 2/2019 | Irci et al. | |
| 2008/0316121 A1 | 12/2008 | Hobson et al. | |
| 2013/0293425 A1 | 11/2013 | Zhu et al. | |
| 2019/0081386 A1 | 3/2019 | Edwards et al. | |

FOREIGN PATENT DOCUMENTS

| | | | | |
|---|---|---|---|---|
| CN | 101872897 A | 10/2010 | | |
| CN | 102646861 A | 8/2012 | | |
| CN | 106025514 A | 10/2016 | | |
| CN | 106252829 A | 12/2016 | | |
| CN | 108321497 A | 7/2018 | | |
| CN | 108539369 A * | 9/2018 | ........... H01Q 1/2258 | |
| CN | 108879112 A | 11/2018 | | |
| CN | 208622945 U | 3/2019 | | |
| CN | 109565107 A | 4/2019 | | |
| CN | 109586031 A | 4/2019 | | |
| EP | 2 224 539 A1 | 9/2010 | | |
| TW | 201526383 A | 7/2015 | | |

* cited by examiner

*Primary Examiner* — Hoang V Nguyen
(74) *Attorney, Agent, or Firm* — Maier & Maier, PLLC

(57) ABSTRACT

An antenna assembly for a mobile communication device includes two antennas. The two antennas are disposed in a cavity defined in a side frame member of the mobile communication device. The two antennas are disposed adjacent with a gap in between. An antenna feed point is disposed in connection with each antenna. One antenna element of each antenna is disposed on a surface of side frame member surrounding the cavity.

20 Claims, 11 Drawing Sheets

80

SELF-DECOUPLED COMPACT CAVITY ANTENNA

CROSS-REFERENCE TO RELATED APPLICATIONS

This application is a National Stage of International Application No. PCT/EP2019/067883, filed on Jul. 3, 2019, which is hereby incorporated by reference in its entirety.

TECHNICAL FIELD

The aspects of the embodiments relate generally to wireless communication devices and, more particularly, to an antenna assembly for a mobile communication device with reduced coupling between antennas.

BACKGROUND

High throughput is one of the properties of the fifth generation (5G) mobile communication applications. Large bandwidths and multiple input multiple output (MIMO) in addition to efficient modulation schemes are needed for high throughput. 5G brings new frequency bands of operation with the new radio (NR) air interface, which frequencies are mostly above the current long term evolution advanced (LTE-A) 3$^{rd}$ generation partnership project (3GPP) frequency bands that cover frequencies up to 2.7 GHz in most regions. Millimeter wave antenna systems are required for gigabit-level bandwidths, but the operation distance is limited when compared to sub-6-gigahertz radio systems. Existing 3GPP bands B42 (3.4-3.6 GHz) and B43 (3.6-3.8 GHz) will be a subset of 5G NR bands n77 (3.3-4.2 GHz) and n79 (4.4-5.0 GHz). The 5G NR bands n77 and n79 have a combined bandwidth of 1.5 GHz, which is more than all the existing cellular bands together in a typical user equipment (UE).

Wide-band antennas with frequency bandwidth of more than 1 GHz are needed that can be located over the display or other conductive structural parts (i.e., "on ground") of a user equipment (UE). Moreover, the length of the antennas should in the vicinity of half wavelengths of the lowest resonance frequency in free space due to the need for at least four Multiple Input Multiple Output (MIMO) antennas and much smaller in other directions.

Existing long term evolution antennas are usually found in the top and bottom regions of a user equipment (UE) such as a mobile communication device. Thus, when adding antennas, the only free volume is typically found on or along the long edges or sides of the mobile communication device. The most challenging environment for side antenna designs is in mobile communication devices such as smart phones with metal frames or metal rings. The reason for this is that metal frames typically have very small spacing relative to the nearby metal parts inside of the smart phone, such as the battery compartment wall, battery, cameras, shielding cans on the nearby printed circuit boards (PCBs), etc. This leaves very limited antenna volume and antennas become narrowband and with low radiation efficiency. There are additional constraints due to the utilization of large displays (called also full or infinity displays), which again tends to limit the available antenna volume in a mobile communication device.

For MIMO antennas, it is essential to have good isolation between antennas to avoid antenna performance degradation. To achieve isolation, grounding is required between antennas which are operating at same frequency.

Accordingly, it would be desirable to be able to provide an antenna assembly for a mobile communication device that addresses at least some of the problems identified above.

SUMMARY

It is an object of the embodiments to provide an antenna assembly for a mobile communication device.

According to a first aspect the above and further objects and advantages are obtained by an antenna assembly for a mobile communication device that has a frame with a side frame member. The side frame member defines a cavity. In one embodiment, the antenna assembly includes a first antenna and a second antenna. The first antenna and the second antenna are disposed within the cavity. The first antenna has a first end and a second end, with a first antenna feed point disposed between the first end and the second end. The second antenna has a first end and a second end with a second antenna feed point disposed between the first end of the second antenna and the second end of the second antenna. The second end of the first antenna is disposed adjacent to the first end of the second antenna. There is a gap separating the second end of the first antenna from the first end of the second antenna. The aspects of the embodiments provide a multi MIMO antenna solution for a mobile device with a metal frame with broadband and efficient performance as well as isolation between antennas. Grounding is not required between the MIMO antennas and mutual coupling of coupled antennas is reduced.

In a possible implementation form of the antenna assembly according to the first aspect, the side frame member of the frame of the mobile communication device includes one or more of a left side member, a right side member, a top side member or a bottom side member of the frame. The aspects of the embodiments are directed to adding additional antennas into a free volume of the frame of the mobile communication device, while reducing mutual coupling of coupled antennas.

In a possible implementation form of the antenna assembly according to the first aspect, the first antenna and the second antenna are disposed lengthwise within the cavity defined by the side frame member. The aspects of the embodiments are directed to adding additional antennas into a free volume of the frame of the mobile communication device, which is typically the long side or edge, such as the left or right side.

In a possible implementation form of the antenna assembly according to the first aspect, the side frame member is a long side of the frame. The aspects of the embodiments are directed to adding additional antennas into a free volume of the frame of the mobile communication device, which is typically the long side or edge, such as the left or right side.

In a possible implementation form of the antenna assembly according to the first aspect, the first antenna and the second antenna are disposed lengthwise within the cavity along a long side of the frame member. The aspects of the embodiments provide for MIMO cavity antennas operating at the same frequency to be adjacently spaced, such as side by side or end to end, while acting as decoupled antennas without the need for any matching components or structure in between them.

In a possible implementation form of the antenna assembly according to the first aspect, the first antenna includes a first antenna element and a second antenna element. The first antenna element is disposed on a surface surrounding the cavity. The second antenna element extends away from the first antenna element and into the cavity. The two antenna elements form an antenna resonating structure where one of the antenna elements is located on or along a surface of the cavity and the other antenna element is located inside the cavity.

In a possible implementation form of the antenna assembly according to the first aspect a first edge member of the first antenna element is connected to a first edge member of the second antenna element. The two antenna elements form an antenna resonating structure where one of the antenna elements is located on a surface of the cavity and the other antenna element is located inside the cavity.

In a possible implementation form of the antenna assembly according to the first aspect a second edge member of the first antenna element of the first antenna is connected to the surface of the side frame member defining the cavity. The two antenna elements form an antenna resonating structure where one of the antenna elements is located on a surface of the cavity and the other antenna element is located inside the cavity.

In a possible implementation form of the antenna assembly according to the first aspect the second antenna includes a first antenna element and a second antenna element. The first antenna element of the second antenna is disposed on the surface of the side frame member defining the cavity and the second antenna element of the second antenna extends away from the first antenna element and into the cavity. The pair of MIMO antennas cover the same frequencies without the need for matching components or structures between them.

In a possible implementation form of the antenna assembly according to the first aspect a first edge member of the first antenna element of the second antenna is connected to a first edge member of the second antenna element of the second antenna. The two antenna elements form an antenna resonating structure where one of the antenna elements is located on a surface of the side frame member defining the cavity and the other antenna element is located inside the cavity.

In a possible implementation form of the antenna assembly according to the first aspect the second antenna element of the first antenna is aligned parallel to the side frame member and is separated by a distance from the long side of the side frame member. The inductance L is formed from loop currents and capacitance C is formed between the antenna element inside the cavity and the longer edges or sides of the cavity. Self-decoupling behavior comes from the LC resonance that is formed in the antenna structure itself, and mutual coupling between the two antennas is reduced.

In a possible implementation form of the antenna assembly according to the first aspect the surface includes an inner surface of the side frame member or an outer surface of the side frame member. The inductance L is formed from loop currents and capacitance C is formed between the antenna element inside the cavity and the longer edges or sides of the cavity. Self-decoupling behavior comes from the LC resonance that is formed in the antenna structure itself, and mutual coupling between the two antennas is reduced.

In a possible implementation form of the antenna assembly according to the first aspect a shape of the cavity defined by the side frame member is one of rectangular or cylindrical, and a length of the cavity defined by the side frame member has a dimension that is greater than a width of the cavity. An antenna resonating structure is formed by the two antenna elements. The cavity may have dimensions that are substantially less than half of a wavelength at the antenna's desired operating frequency.

In a possible implementation form of the antenna assembly according to the first aspect a shape of the first antenna and a shape of the second antenna is one of an L-shape, a T-shape, a Z-shape, an S-shape or a step shape. The design of optimal dimensions of the cavity antenna elements can lead to optimized efficiency and isolation for the multi-antenna system. By adjusting the shape of the cavity antenna element, it is possible to tune the resonance frequency of the cavity antenna, where the width of the cavity antenna is limited.

In a possible implementation form of the antenna assembly according to the first aspect the gap between the first antenna and the second antenna defines a T-shaped slot. By making a T-shaped slot between the two antenna resonating elements, further isolation improvement is realized.

In a possible implementation form of the antenna assembly according to the first aspect the first antenna feed point is disposed adjacent to the second antenna feed point. The antenna elements and the feeding points can be mirrored to each other. Further isolation improvement is realized.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and are non-limiting. Additional aspects and advantages of the embodiments will be set forth in the description that follows, and in part will be clear from the description, or may be understood by practice of the embodiments.

BRIEF DESCRIPTION OF THE DRAWINGS

In the following detailed portion, the embodiments will be explained in more detail with reference to the drawings, in which.

DETAILED DESCRIPTION OF THE EMBODIMENTS

Figure 1:
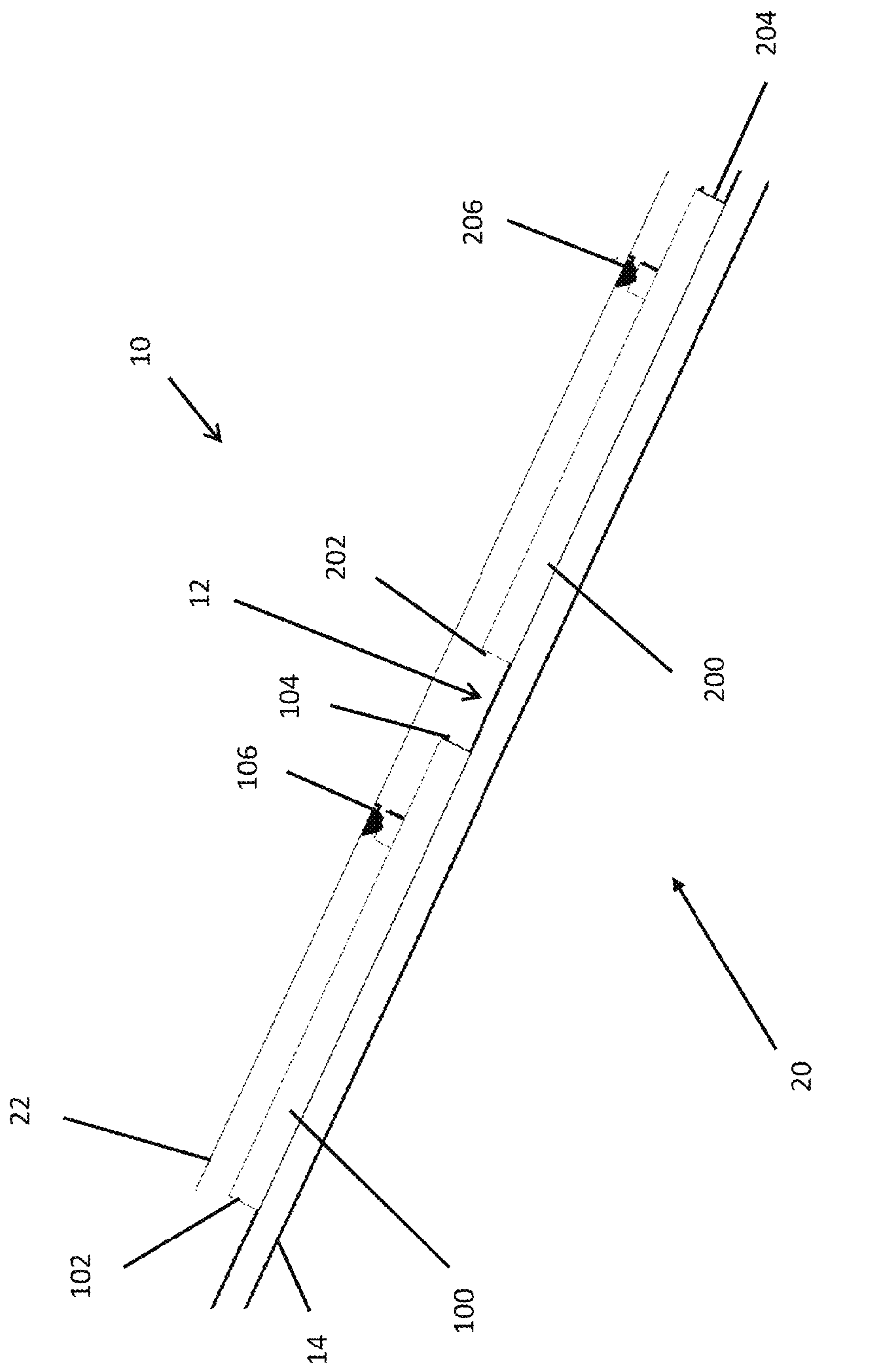
FIG. 1 illustrates a perspective schematic view of exemplary antenna assembly incorporating aspects of the embodiments.

Referring to FIG. 1 there can be seen a perspective view of a portion of an antenna assembly 10 implemented in exemplary apparatus such as a mobile communication device 20. The aspects of the embodiments are directed to an antenna assembly, such as a multi MIMO antenna assembly, for a user equipment 20 that has a conductive or metal frame 22. The MIMO antenna assembly can include a 4×4 MIMO antenna or an 8×8 MIMO antenna, for example. The user equipment 20 in this example includes a mobile communication device, such as a smartphone, for example. In alternate embodiments, the mobile communication device 20 can include any suitable communication device, other than including a smartphone. Despite being disposed in the metal frame 22 of the mobile communication device 20, the antenna assembly 10 of the embodiments provides broadband and efficient performance with good isolation between the antennas and does not require any grounding between the antennas. Mutual coupling between coupled antennas is reduced.

As shown in FIG. 1, the mobile communication device 20 has a frame 22 with at least one side member 14, also referred to herein as a side frame member. While only one side frame member 14 will be referred to herein, the aspects of the embodiments are not limited thereto. As will generally be understood, a typical frame 22 of a mobile communication device 20 has four side frame members, namely a top, bottom, left and right side member. The antenna assembly 10 of the embodiments can be implemented in any one or more of the four side frame members, depending upon size requirements and space limitations. However, since existing long term evolution (LTE) antennas are usually found in the top and bottom regions of a mobile communication device, the aspects of the embodiments will be described with respect to adding additional antenna to the side regions, or side frame members.

The aspects of the embodiments are directed to disposing two antennas adjacently in a free volume of a side frame member 14 of the frame 22 of the mobile communication device 20. While two antennas are referred to herein, the aspects of the embodiments are not limited thereto. In alternate embodiments, the antenna assembly 10 can include any suitable number of antennas, other than including two. In one embodiment, antenna assembly 10 is directed to a group with a minimum of two antennas.

In one embodiment, the antenna assembly 10 is configured to be disposed in a long side frame member of the frame 22. The left side member and the right side member of a mobile communication device 20 tend to be longer than the top side member and the bottom side member. A longer side frame member will typically present a larger space where multiple antennas can be placed, as is further described herein.

As shown in FIG. 1, the antenna assembly 10 includes at least a first antenna 100 and a second antenna 200. The first antenna 100 and the second antenna 200 can also be referred to singularly as a "cavity antenna" or collectively as "cavity antennas." As is illustrated in the sectional view of FIG. 2, the side frame member 14 of the frame 22 defines a cavity 26. The first antenna 100 and the second antenna 200 are configured to be disposed within the cavity 26. While the embodiments herein will generally be with respect to the first antenna 100 and/or the second antenna 200, the embodiments herein also applies to any antenna that may include the antenna assembly 10.

In the example of FIG. 1, the first antenna 100 has a first end 102 and a second end 104. An antenna feed point 106, referred to herein as the first antenna feed point 106, is configured to be disposed between the first end 102 and the second end 104 of the first antenna 100.

The second antenna 200 has a first end 202 and a second end 204. In this example, an antenna feed point 206, referred to herein as a second antenna feed point 206, is configured to be disposed between the first end 202 and the second end 204 of the second antenna 200.

The antenna feed points 106, 206 can include any suitable antenna feeding structure. An antenna feeding structure with its matching circuit can lead to optimizing antenna resonances and efficiency. In one embodiment, the antenna feed points 106, 206 can be formed from printed multiyear flexible printed circuits (FPC) and attached to corresponding feeding tabs/posts. The antenna feed points 106, 206 can have capacitive or inductive coupling.

As shown in the example of FIG. 1, the first antenna 100 is disposed adjacent to the second antenna 200 in the cavity 26. The second end 104 of the first antenna 100 is configured to be disposed adjacent to the first end 202 of the second antenna 200. In this example, the first antenna 100 and the second antenna 200 are disposed lengthwise, end to end. A gap or space 12 separates the second end 104 of the first antenna 100 from the first end 202 of the second antenna 200. In one embodiment, a size or dimension of the separation or gap 12 is in the range of 5 millimeters to and including 7 millimeters. In alternate embodiments, the dimensions of the antennas 100, 200 and the separation 12 are any dimensions suitable for the particular application, such as a mobile communication device. Because of the unique arrangement and configuration of the first antenna 100 and the second antenna 220, there is no need for a ground connection, decoupling networks, matching components or other structure and coupling between the first antenna 100 and the second antenna 200.

The first antenna 100 and the second antenna 200 are configured as cavity antenna structures, with lengths that are less than half-wavelength. In one embodiment, the first antenna 100 and the second antenna 200 are configured to cover for example, the 5G New Radio (NR) frequency range (FR) frequency bands n77 and n79. In alternate embodiments, the antenna assembly 10 of the embodiments can be configured to cover any suitable frequency range.

Figure 2:
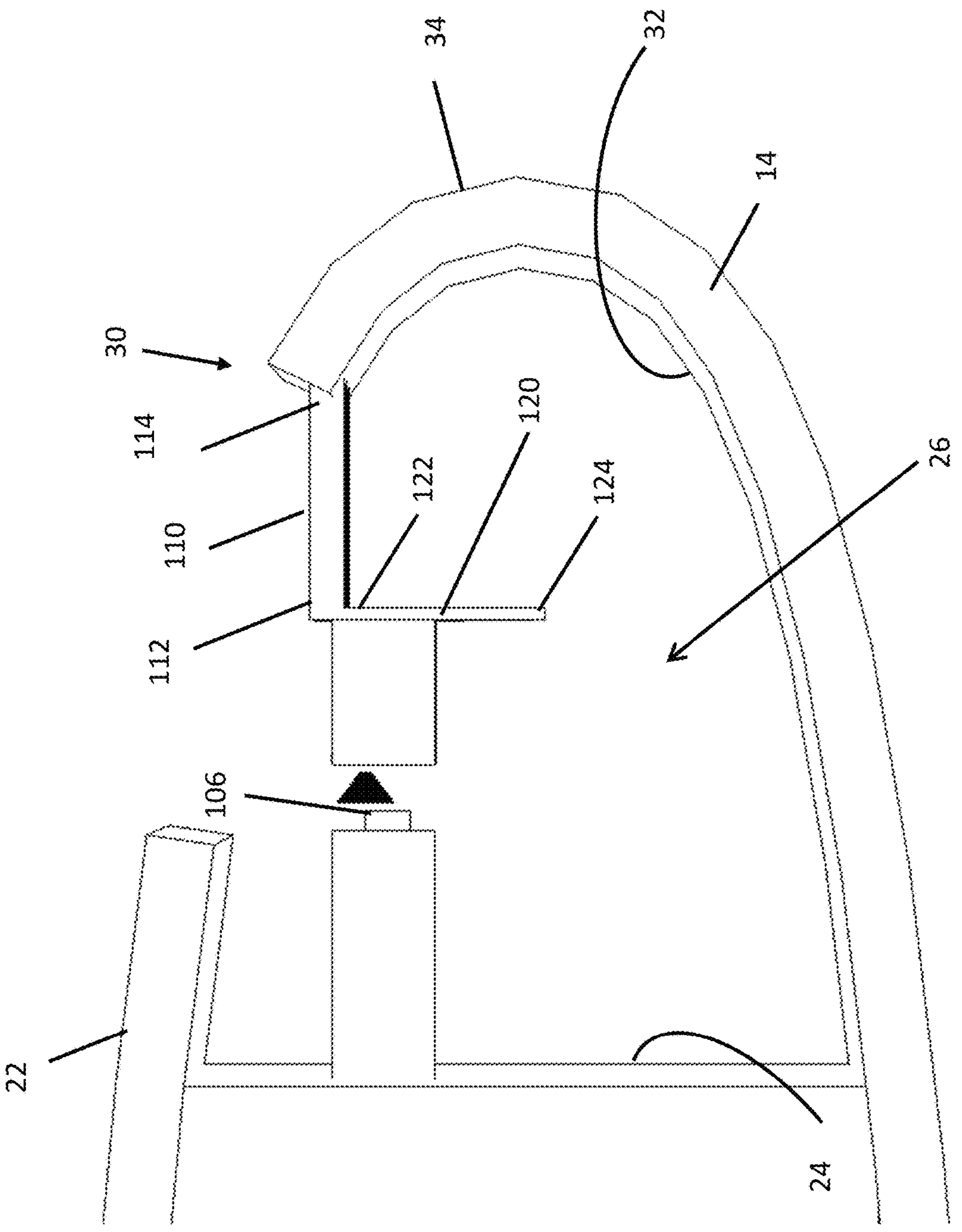
FIG. 2 illustrates a cross-sectional schematic view of a side frame member of a mobile communication device with an antenna assembly incorporating aspects of the embodiments.

FIG. 2 illustrates a cross-sectional view of an exemplary side frame member 14 and the first antenna 100 of antenna assembly 10 in the cavity 26. While reference is made herein only to the first antenna 100, the description that follows also applies to the second antenna 200, and any further cavity antenna of the antenna assembly 10. In this example, the cavity 26 has a substantially oval or oblong shape. The wall 24 on one side of the cavity 26 can represent another component or device of the mobile communication device, such a battery, battery compartment or printed circuit board. In alternate embodiments, the shape of the cavity 26 can be any suitable shape, such as a rectangular or cylindrically shaped cavity.

The surfaces of the cavity 26 formed by the side frame member 14 include an inner surface 32 and an outer surface 34. The length of the side frame member 14 will be longer than a width of the cavity 26. The dimensions of the cavity 26 may be substantially less than a half of a wavelength at the desired operating frequency of the antenna assembly 10.

As shown in FIG. 2, the first antenna 100 has a first antenna element 110 and a second antenna element 120. The first antenna element 110 has a first side or edge 112 and a second side or edge 114. The second antenna element 120 has a first side or edge 122 and a second side or edge 124. The first sides 112, 122 and the second sides 114, 124 form the longer edges of the respective antenna elements 110, 120. The length of the antenna elements 110, 120 shown in FIG. 2 are longer than their height and width.

In the example of FIG. 2, the first antenna element 110 is disposed on or in connection with the inner surface 32 of the side frame member 14 defining the cavity 26 or the outer surface 34 of the side frame member 14. The second antenna element 120, which is connected to the first antenna element 110, is disposed within the cavity 26. In one embodiment, the second antenna element 120 is configured to be oriented substantially parallel to and with the length of the side frame member 14 but separated from the side frame member 14 by a distance. The feed point 106 for the first antenna 100 in this example is connected to the second antenna element 120.

In one embodiment, the first antenna element 120 is configured to be disposed on and/or conform to a shape of the inner surface 32 or the outer surface 34 of the side frame member 14, depending upon the application. For example, in one embodiment, one or more of the first antenna 100 and the second antenna 200 can be formed from printed multilayer flexible printed circuits (FPC), foil tape, copper tape, or conductive paint, such silver paint. These materials can be applied to conform to the applicable surface 32, 34.

Figure 3:
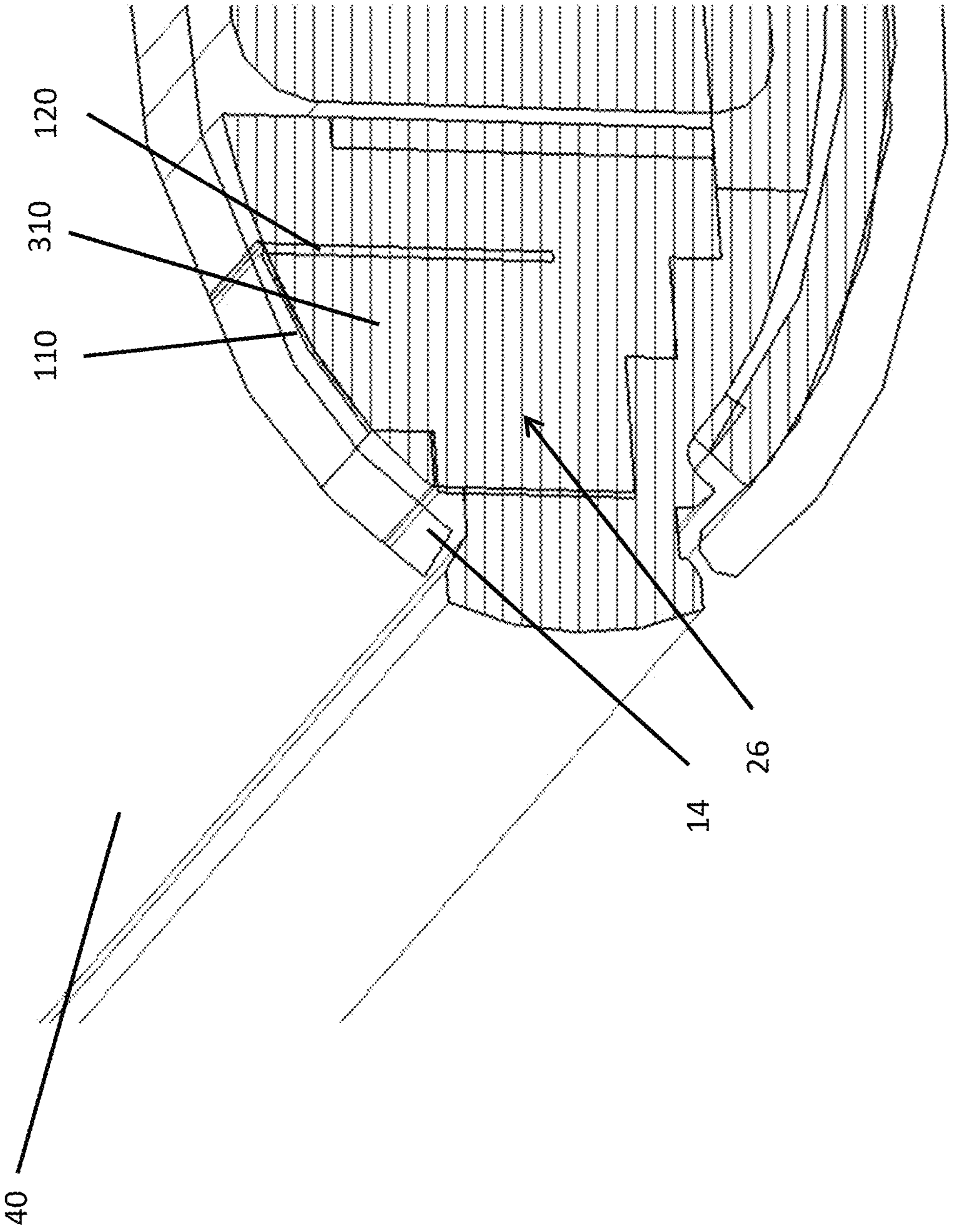
FIG. 3 illustrates a sectional view of an exemplary antenna assembly incorporating aspects of the embodiments.

FIG. 3 illustrates a cross-sectional view of an exemplary side frame member 14 incorporating an antenna assembly 10 of the embodiments. In this example, the mobile communication device 10 includes a glass back cover 40. The first antenna element 110 is disposed on and/or connected to an inner surface 32 of the glass back cover 40 and/or the side frame member 14. The second antenna element 120 is disposed within the cavity 26. As shown in FIG. 3, the first antenna element 110 is configured to conform to the shape of the glass back cover 40 or the inner surface 32 of the side frame member 14.

In the example of FIG. 3, the cavity 26 is filled with a dielectric material 310. The dielectric material 310 can have different permittivity and provide good structural strength to support the antenna assembly 10, and in particular the second antenna element 120. The cavity 26 can also be filled with or include glass, ceramic, carbon fiber, composites or other dielectric layers.

Figure 4:
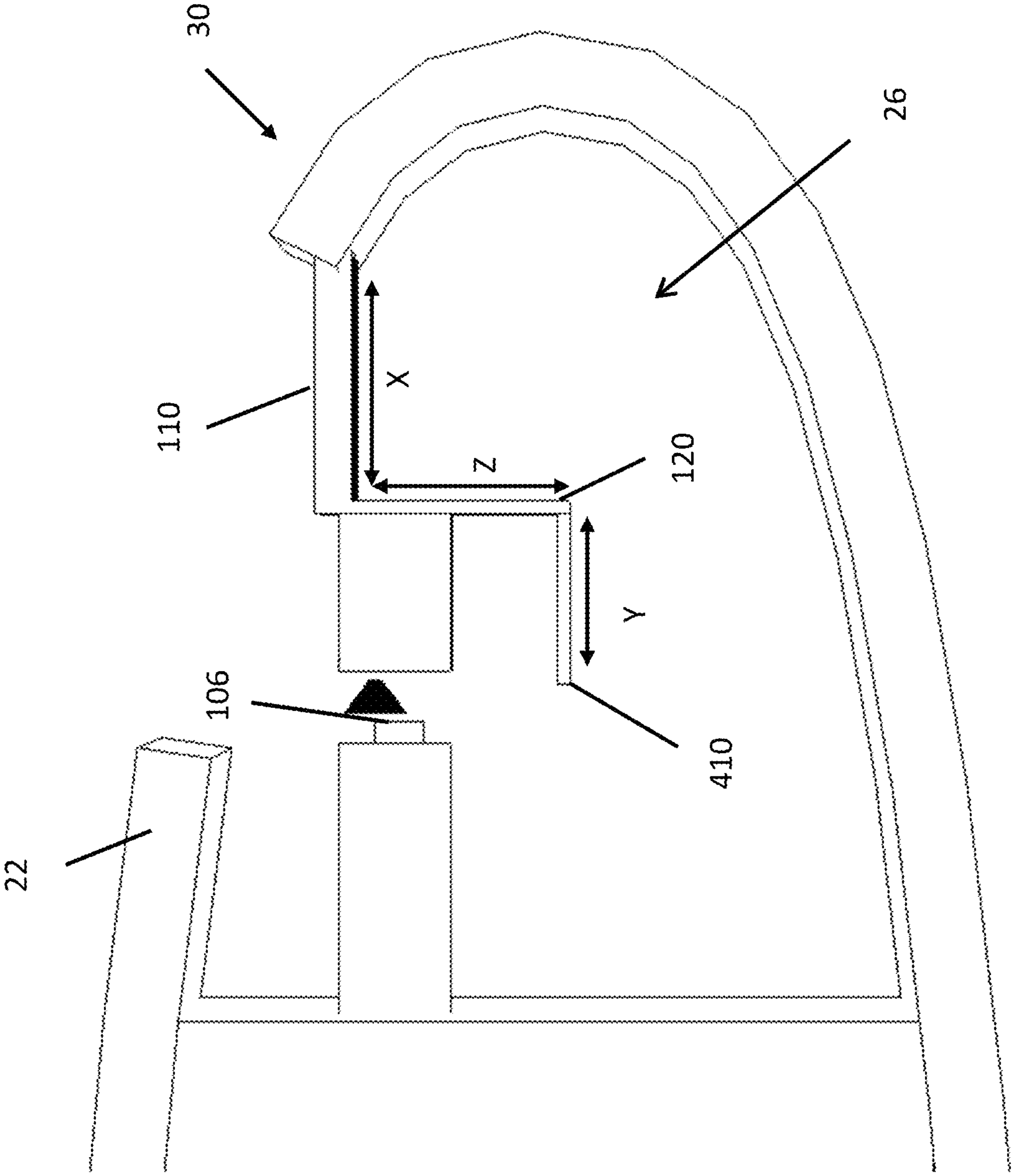
FIG. 4 illustrates a sectional schematic view of an exemplary antenna assembly incorporating aspects of the embodiments.
Figure 5:
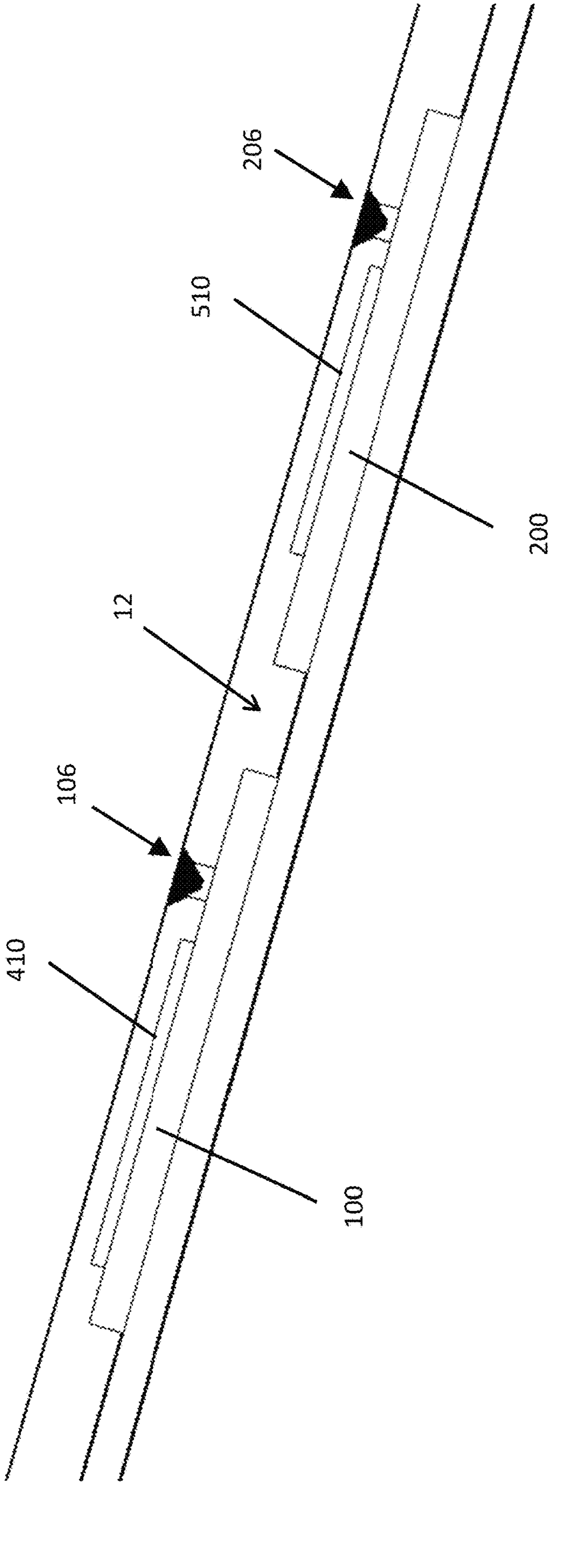
FIG. 5 illustrates a perspective schematic view of an exemplary antenna assembly incorporating aspects of the embodiments.

FIG. 4 illustrates another example of an antenna assembly 10 incorporating aspects of the embodiments. In this example, the shape of the exemplary antenna 100 is configured to include an additional antenna element 410. This particular configuration can be referred to as a Z-shape, reverse Z-shape or a step shape. In this example, antenna element 410 is connected to an end of antenna element 120. In alternate embodiments, antenna element 410 can be connected to any suitable or desired portion of the antenna elements 110 and 120. By adjusting the shape of the antenna 100, is possible to tune the self-resonance frequency of antenna 100. This is particularly beneficial where width of the cavity 26 is limited. FIG. 5 illustrates an additional antenna element 510 of the second antenna 200.

The shape of the antenna 100 can include any suitable shape, such as an L shape, a Z shape, an S shape, or a T shape, for example. The configurations can also be inverted or backwards, such as the inverted Z shape shown in FIG. 4. The design of optimal dimensions of antenna elements for the antenna 100 can lead to optimized efficiency and isolation for the antenna assembly 10.

In the example of FIG. 4, the antenna 100 has a Z type shape. Exemplary dimensions for the shape of the antenna 100 shown in FIG. 4 include approximately 1.9 millimeters in the X direction, approximately 1.6 millimeters in the Y direction and approximately 1.4 millimeters in the Z direction. In alternate embodiments, the X, Y and Z dimensions of the antenna 100 can be any suitable dimensions.

Referring to FIG. 5, in this example, the shape of the gap or slot 12 between the first antenna 100 and the second antenna 200 is a T-shaped slot. By shaping the slot 12 between the two antennas 100, 200, it is possible to further improve the isolation between the first antenna 100 and the second antenna 200.

Figure 6:
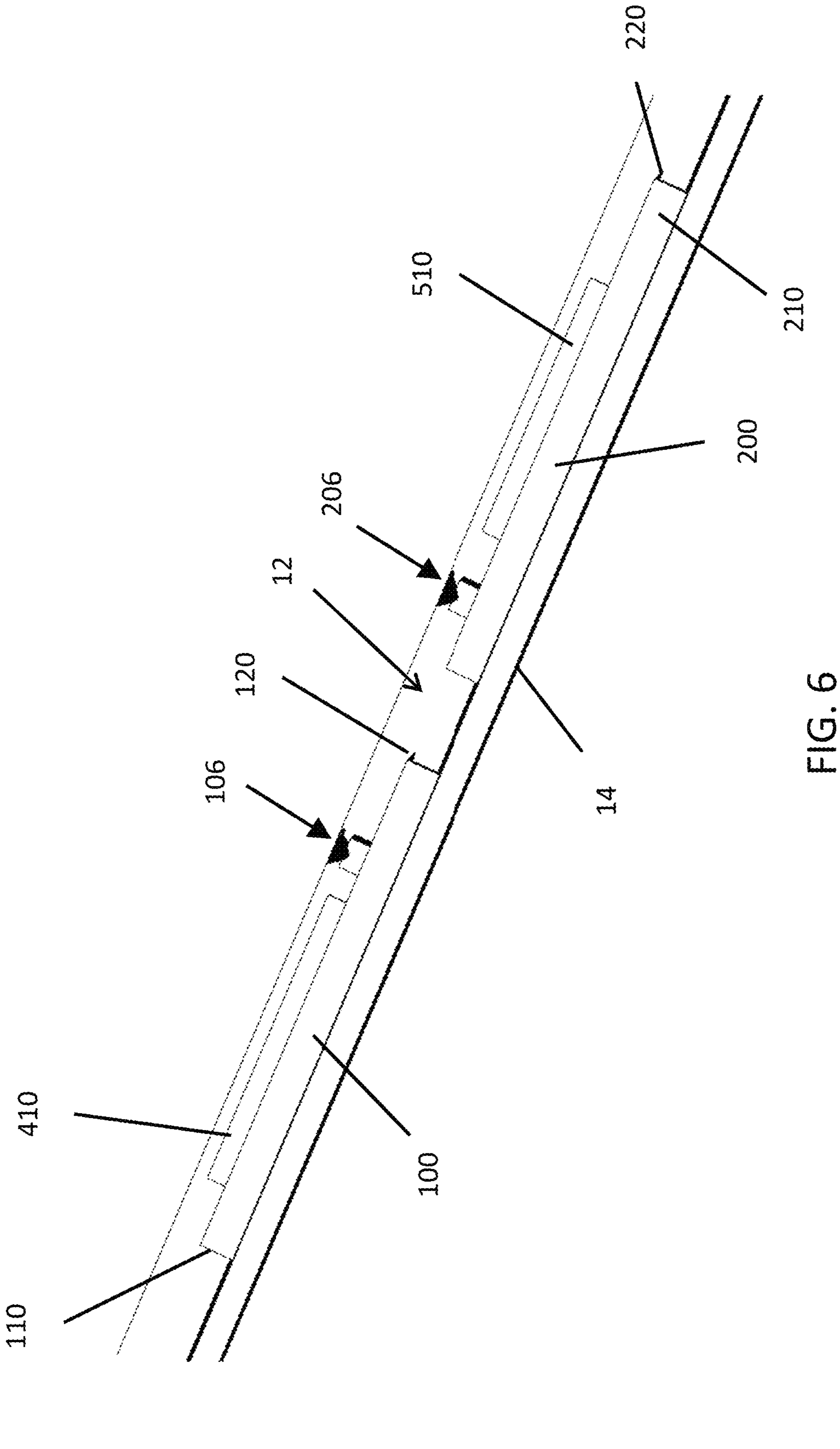
FIG. 6 illustrates a perspective schematic view of an exemplary antenna assembly incorporating aspects of the embodiments.

FIG. 6 illustrates another exemplary antenna assembly 10. In this example the positions of the respective antenna feed points 106, 206 are shifted relative to the embodiment shown in FIG. 1. In the example of FIG. 6, the antenna feed points 106, 206 are disposed closer to one another. As shown in FIG. 6, the antenna feed point 106 of the first antenna 100 is positioned adjacent to the antenna feed point 206 of the second antenna. In one embodiment, the antenna feed points 106, 206 can be disposed side by side. The slot 12 in this example is a T-shaped slot, although any suitably shaped slot can be used. In this example, the antennas 100 and 200 include additional antenna elements 410 and 510, respectively.

Figure 7:
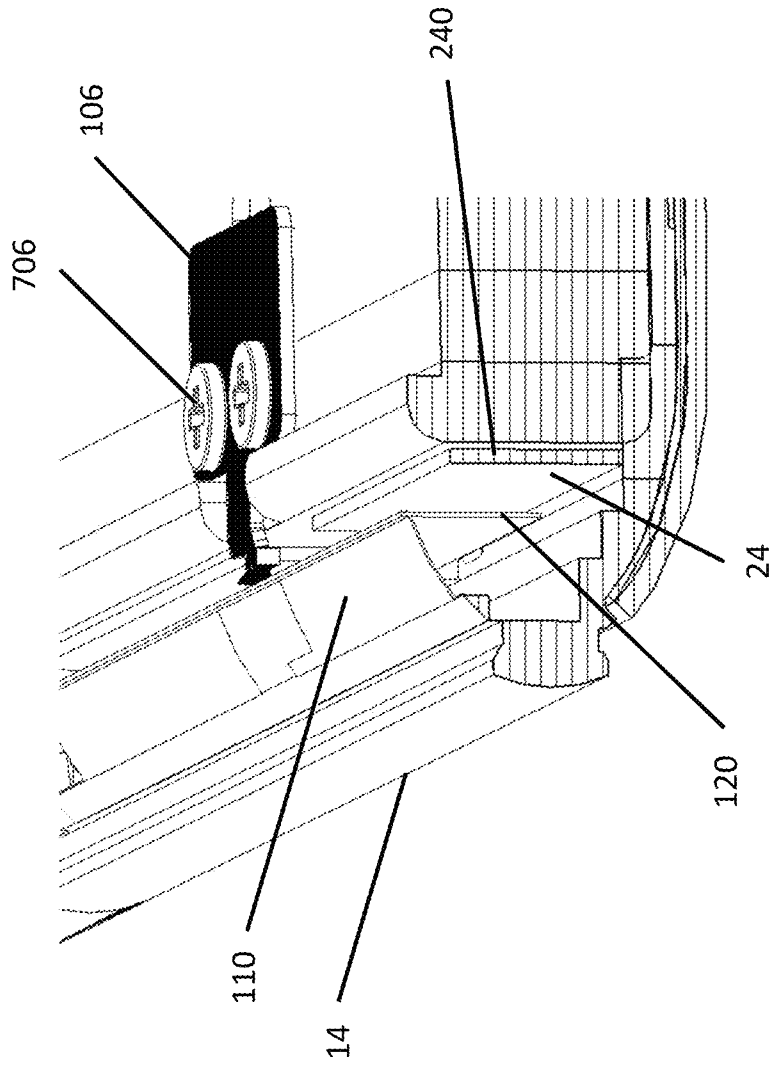
FIG. 7 illustrates a sectional view of a frame member of a mobile communication device including an exemplary antenna assembly incorporating aspects of the embodiments.

FIG. 7 illustrates a sectional view of an antenna assembly 10 incorporating aspects of the embodiments implemented in a mobile communication device 20. In this example, the antenna assembly 10 includes a first antenna element 110 and a second antenna element 120 disposed in a long side frame member 14. A battery device 240 is disposed on one side or wall 24 of the side frame member 14. The example of FIG. 7 illustrates the antenna feed point 106 of the antenna assembly 100 and its corresponding connection point(s) 706. In this example the antenna feed point 106, also referred to as an antenna feeding structure, is formed from printed multilayer FPC with matching lumped components.

Figure 8:
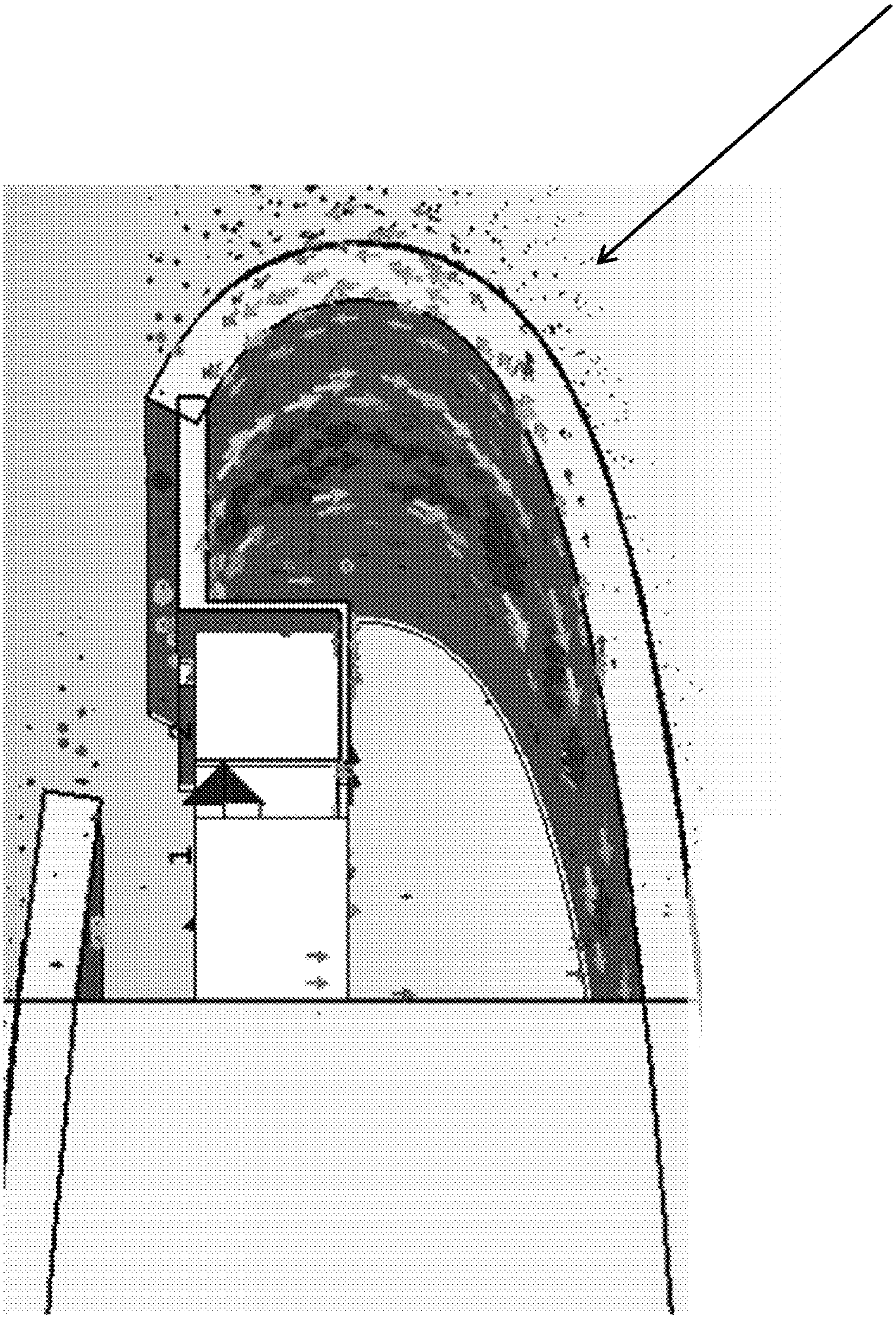
FIG. 8 illustrates exemplary loop surface currents which form inductances in a cavity antenna of an antenna assembly incorporating aspects of the embodiments.
Figure 9:
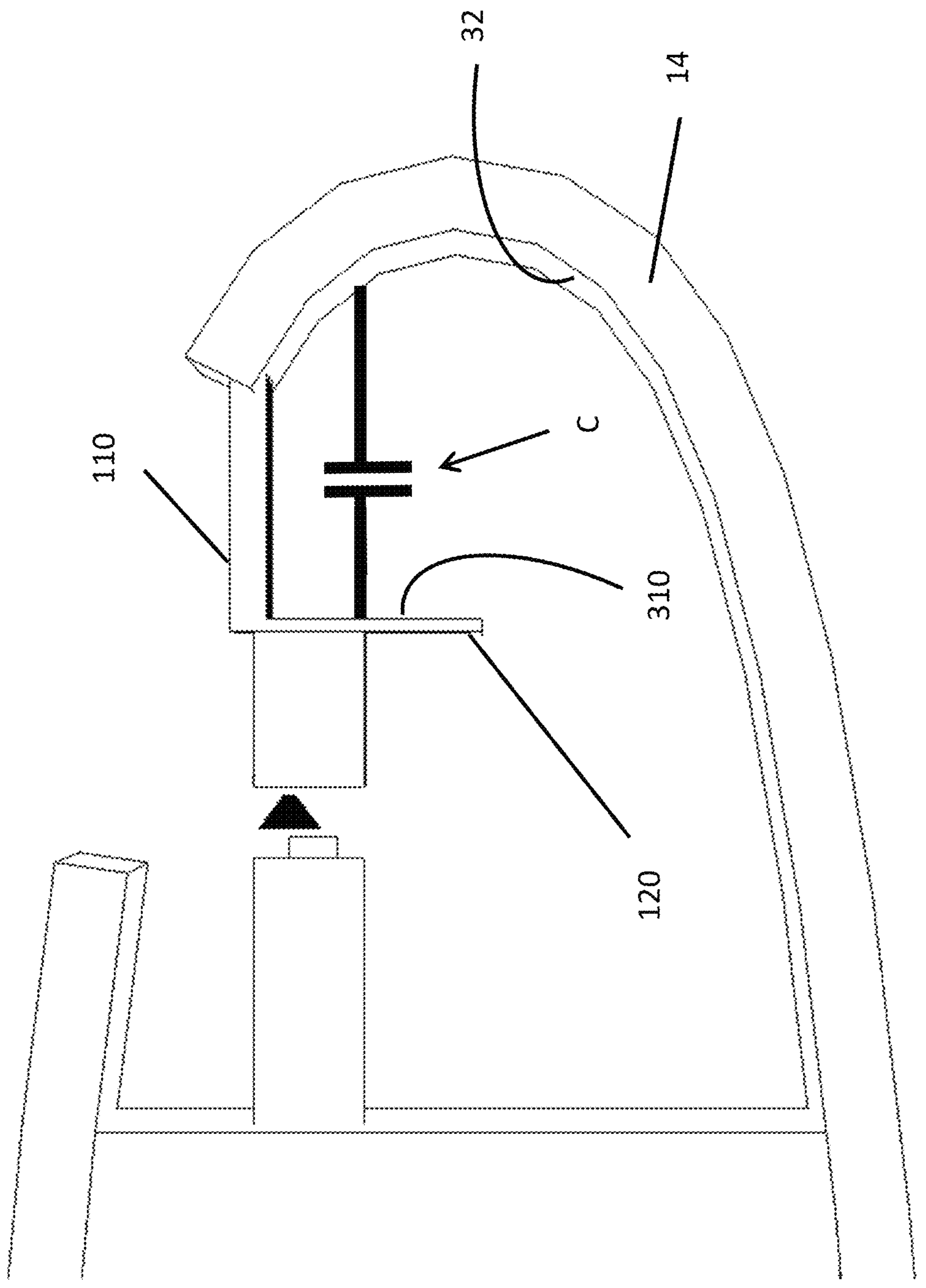
FIG. 9 illustrates the capacitance behavior in a cavity antenna of an antenna assembly incorporating aspects of the embodiments.

Referring to FIGS. 8 and 9, the self-decoupling behavior of the antenna assembly 10 comes from the LC resonance, which is formed in the antenna structure itself, such that mutual coupling between the first antenna 100 and the second antenna 200 is reduced. As is illustrated in FIG. 8, the inductance is formed from loop currents, generally illustrated as arrows 80. In the example of FIG. 9, the side frame member 14 is metal and the capacitance C is formed between an interior surface 310 of the second antenna element 120 and the inner surface 32 of the side frame member 14.

Figure 10:
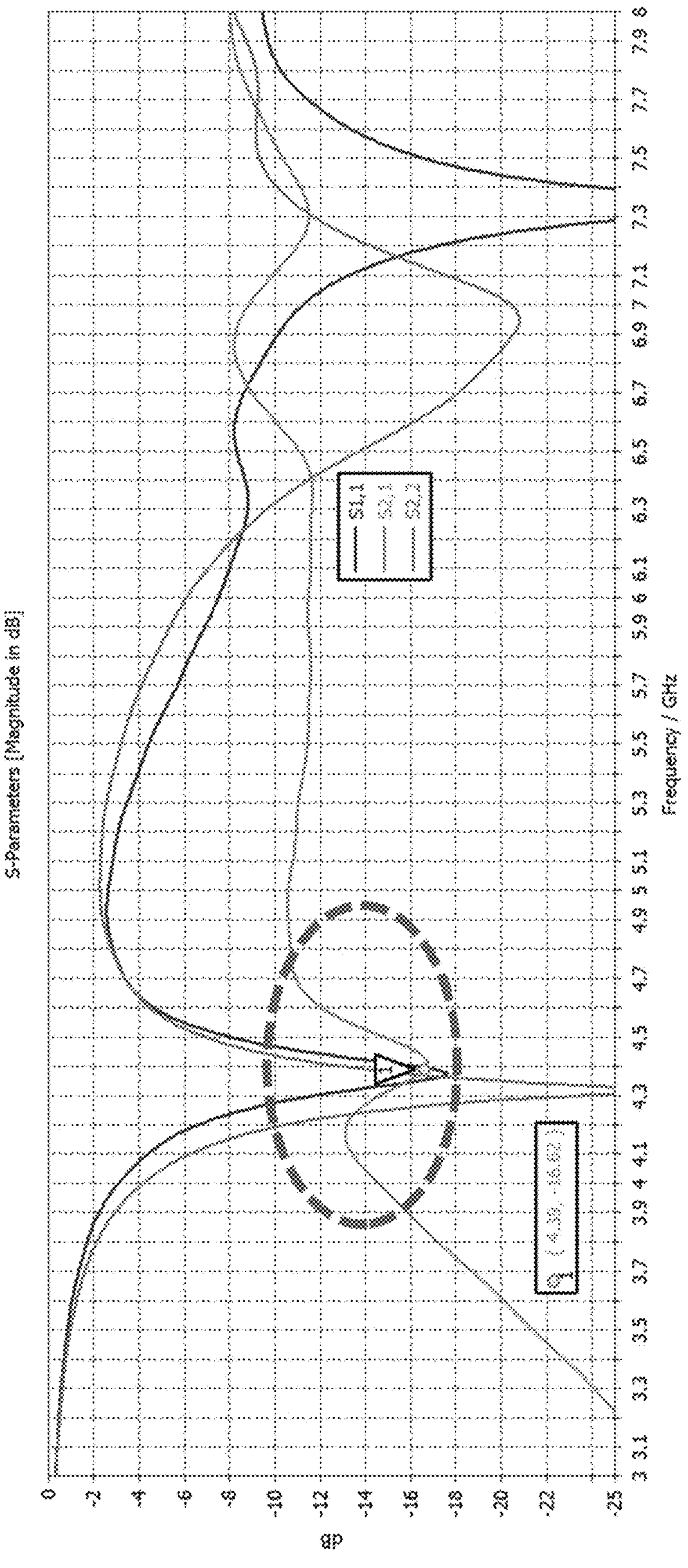
FIG. 10 is a graph illustrating results of S-parameter efficiency of an antenna assembly incorporating aspects of the embodiments.

FIG. 10 is a graph illustrating the S-parameters (S2,1) of two self-decoupled cavity antennas incorporating aspects of the embodiments operating at same frequency bands. In this example, the isolation S2,1 at 4.3 GHz is −16 dB while the return loss is −18 dB.

Figure 11:
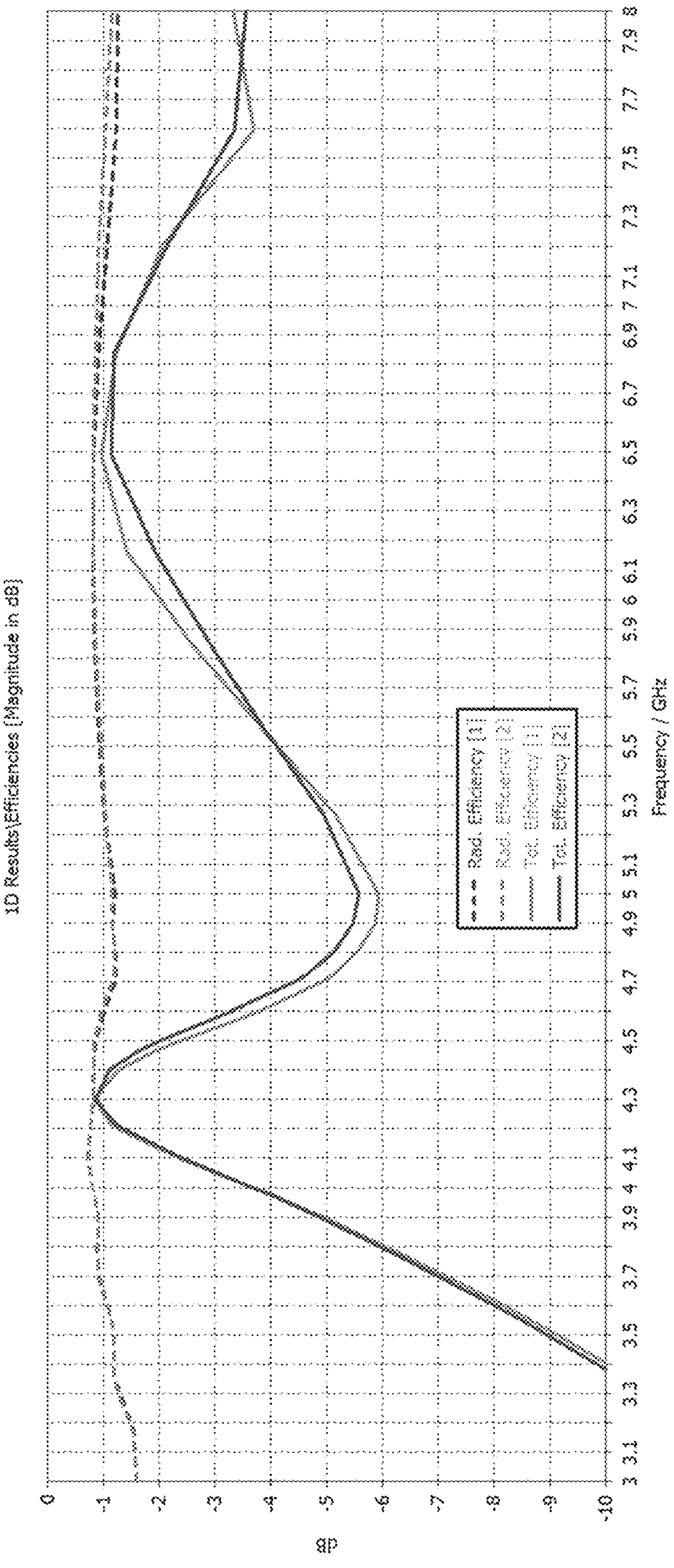
FIG. 11 is a graph illustrating the efficiencies of two self-decoupled antenna assemblies incorporating aspects of the embodiments.

FIG. 11 is a graph illustrating the efficiencies of two self-decoupled cavity antennas incorporating aspects of the embodiments. As is seen in the exemplary graph of FIG. 11, good wide band radiation performance is achieved.

The antenna assembly 10 of the embodiments is directed to a minimum group of two cavity antennas, such as antennas 100, 200, which will reduce mutual coupling and provide good isolation between the different cavity antennas without the need of grounding, circuits or additional structure connecting or between them. The antenna assembly 10 will provide improved wide bandwidth and efficiency comparing to the ordinary antennas with ground in middle between antennas.

The cavity antennas of the antenna assembly 10 are generally configured as MIMO antennas operating at the same frequency and act as self-decoupled antennas. The antenna assembly of the embodiments eliminates the need for any matching components or structure, such as a ground connection or an LC resonator network, connected between the different cavity antennas.

Thus, while various embodiments have been shown and, it is understood that various omissions, substitutions and changes in the form and details of devices and methods illustrated, and in their operation, may be made by those of ordinary skill in the art without departing from the spirit and scope of the embodiments. Further, it is expressly intended that all combinations of those elements, which perform substantially the same function in substantially the same way to achieve the same results, are within the scope of the embodiments. Moreover, it should be recognized that structures and/or elements shown and/or described in connection with any form or embodiment may be incorporated in any other form or embodiment as a general matter of design choice.

The invention claimed is:

1. An antenna assembly for a mobile communication device, the mobile communication device having a frame with a side frame member, the side frame member defining a first side of a cavity, said cavity further defined by a wall provided on an opposite side of the cavity from the side frame member, the antenna assembly comprising:

a first antenna comprising a first antenna element, a first end, a second end, and a first antenna feed point disposed between the first end and the second end, said first antenna feed point connecting the first antenna to a first connection point provided on the wall; and a second antenna comprising a third antenna element, a third end, a fourth end, and a second antenna feed point disposed between the third end and the fourth end, said second antenna feed point connecting the second antenna to a second connection point provided on the wall;

wherein the first antenna and the second antenna are disposed within the cavity defined by the side frame member, the first antenna element and the third antenna element are disposed on a surface surrounding the cavity, and the second end is disposed adjacent to the third end with a gap separating the second end from the third end.

2. The antenna assembly according to claim 1, wherein the side frame member of the frame of the mobile communication device comprises one or more of a left side member, a right side member, a top side member, or a bottom side member of the frame.

3. The antenna assembly according to claim 1, wherein the first antenna and the second antenna are disposed lengthwise within the cavity defined by the side frame member.

4. The antenna assembly according to claim 1, wherein the first antenna comprises a second antenna element extending away from the first antenna element and into the cavity.

5. The antenna assembly according to claim 4, further comprising:

a first edge member of the first antenna element that is configured to be connected to a third edge member of a second antenna element.

6. The antenna assembly according to claim 5, further comprising:

a second edge member of the first antenna element of the first antenna that is configured to be connected to a surface of the side frame member surrounding the cavity.

7. The antenna assembly according to claim 4, wherein the second antenna element is aligned parallel to the side frame member and separated from a surface of the side frame member.

8. The antenna assembly according to claim 1, wherein the second antenna comprises a fourth antenna element extending away from the third antenna element and into the cavity.

9. The antenna assembly according to claim 8, further comprising:

a third edge member of the third antenna element that is configured to be connected to a fourth edge member of the fourth antenna element.

10. The antenna assembly according to claim 1, wherein the surface comprises an inner surface of the side frame member or an outer surface of the side frame member.

11. The antenna assembly according to claim 1, wherein a shape of the cavity is one of an oval shape or an oblong shape, and a length of the cavity has a dimension that is greater than a width of the cavity.

12. The antenna assembly according to claim 1, wherein a shape of the first antenna and a shape of the second antenna is one of an L-shape, a T-shape, a Z-shape, a step shape, or an S-shape.

13. The antenna assembly according to claim 1, wherein the gap between the first antenna and the second antenna defines a T-shaped slot.

14. The antenna assembly according to claim 1, wherein the first antenna feed point is disposed adjacent to the second antenna feed point.

15. The antenna assembly according to claim 1, wherein the first antenna feed point and the second antenna feed point are mirrored to each other.

16. The antenna assembly according to claim 1, wherein a size or dimension of the gap is in a range of 5 millimeters to and including 7 millimeters.

17. The antenna assembly according to claim 1, wherein a length of the cavity is less than a half of a wavelength at an operating frequency of the antenna assembly.

18. The antenna assembly according to claim 1, wherein the first antenna and the second antenna are configured as MIMO antennas operating at the same frequency band.

19. The antenna assembly according to claim 1, wherein there is no grounding connection or an LC resonator network disposed between the first antenna and the second antenna.

20. The antenna assembly according to claim 1, wherein the first antenna and the second antenna are self-decoupled antennas.

* * * * *